May 26, 1970  K. A. ALBERS ET AL  3,514,234

FLUID OPERATED DEVICES

Filed June 10, 1968  6 Sheets-Sheet 1

INVENTORS
KENNETH A. ALBERS
WILLARD P. ARONSON

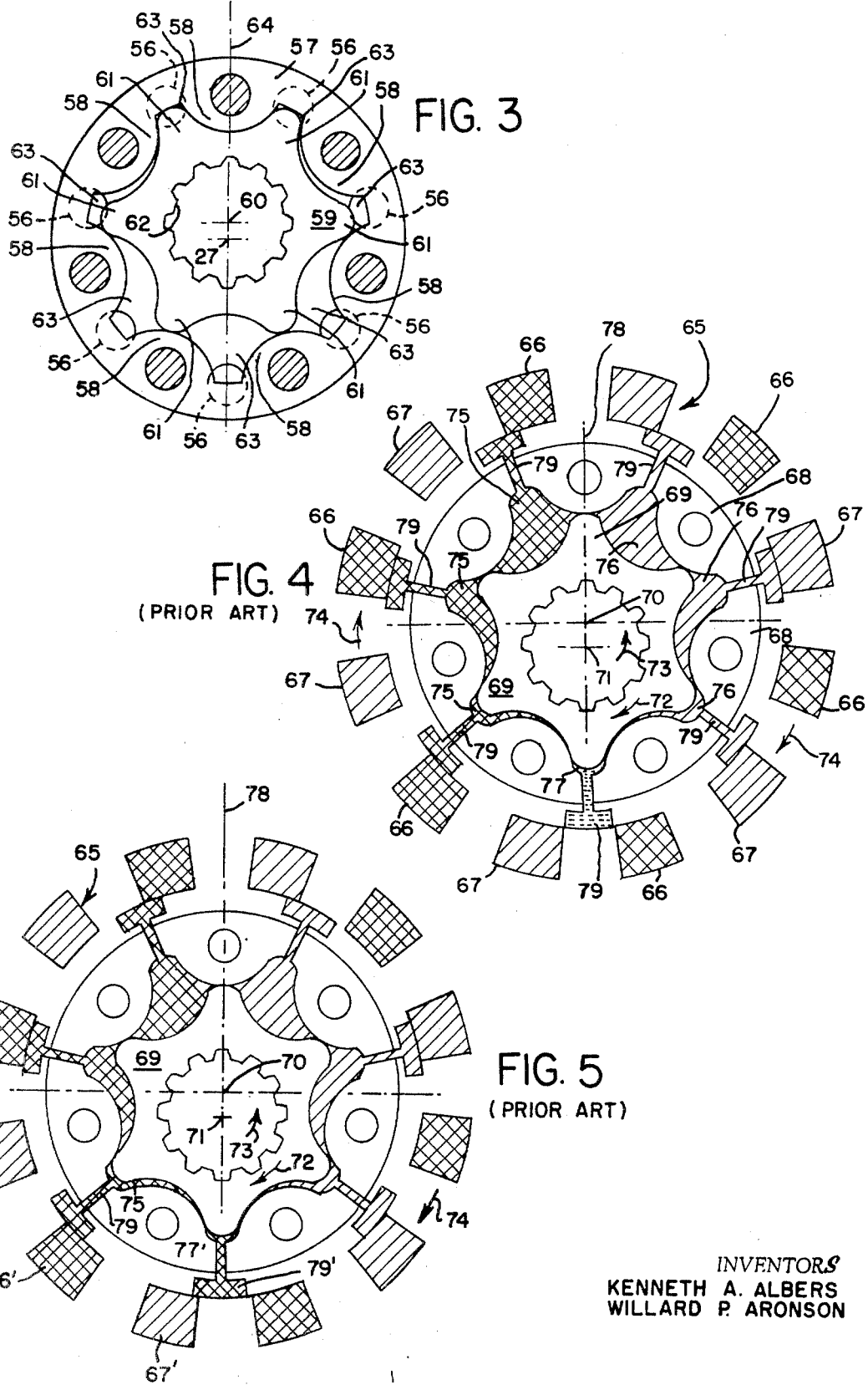

May 26, 1970 K. A. ALBERS ET AL 3,514,234
FLUID OPERATED DEVICES
Filed June 10, 1968 6 Sheets-Sheet 4

INVENTORS
KENNETH A. ALBERS
WILLARD P. ARONSON

May 26, 1970  K. A. ALBERS ET AL  3,514,234

FLUID OPERATED DEVICES

Filed June 10, 1968  6 Sheets-Sheet 5

INVENTORS
KENNETH A. ALBERS
WILLARD P. ARONSON

INVENTORS
KENNETH A. ALBERS
WILLARD P. ARONSON

United States Patent Office 3,514,234
Patented May 26, 1970

3,514,234
FLUID OPERATED DEVICES
Kenneth A. Albers, Bloomington, and Willard P. Aronson, Edina, Minn., assignors to Char-Lynn Company, Eden Prairie, Minn., a corporation of Minnesota
Filed June 10, 1968, Ser. No. 735,814
Int. Cl. F01c 1/10; F04c 1/06
U.S. Cl. 418—61
4 Claims

ABSTRACT OF THE DISCLOSURE

An improvement in fluid operated devices of the type which utilize an external-internal gear displacement mechanism, including reversible motors and motors operable as pumps, the improvement comprising a valve therefor having a valve timing deviation wherein the valve provides early closing of exhaust from predetermined displacement mechanism cells and late pressurizing of predetermined cells in either direction of shaft rotation when the device is utilized as a motor and, when the device is utilized as a pump, providing early closing of pressure ports to predetermined cells and late opening of exhaust ports from predetermined cells, thereby increasing efficiency of the device by compensating for manufacturing errors and component wear.

---

This invention relates to an improvement in fluid operated devices, and more particularly relates to an improved valve therefor providing optimum efficiency in either direction of rotation when the device is utilized as a motor, and optimum efficiency when the device is used as a pump.

BACKGROUND OF THE INVENTION

In a fluid operated pump or motor there is a connection between the displacement mechanism and the valve. This connection is typically called a drive or drive extension and synchronizes the movement of the valve relative to the displacement mechanism. The valve is timed such that fluid is under pressure in predetermined cells and under exhaust in predetermined cells during the operation of the deivce. The valve is typically of the commutating type and may be a radial or disc type valve, or an axial or cylindrical type. Further, the valve may be of a high or low speed type referring to the speed of rotation of the valve as it relates to the displacement mechanism. For example, in a gerotor type mechanism including an outer stationary ring member and an inner rotating orbiting star member a low speed valve rotates at the rotational speed of the star member and a high speed valve rotates at the orbiting speed of the star member. Of course, a drive mechanism is provided which typically connects the star member to the valve for synchronized movement therewith. In reversible motors, and in motors which may be reversed to operate as pumps, it is obvious that the timing of the valve relative to the displacement mechanism must be such that it provides proper operation and optimum efficiency in either direction of rotation.

Known devices have typically provided for reversible operation by providing a symmetrical valve which is timed in such a way that exhaust of a cell begins at the precise moment that pressurizing of that cell ends. However, in the practical application of a device utilizing a symmetrical valve, it was found that timing errors and corresponding efficiency losses resulted. These timing errors resulted from manufacturing errors, from wear between the displacement mechanism and drive connection at one end of the drive and between the drive and valve connection at the other end of the drive, from wear within the displacement mechanism, and, in some instances, by shaft deflection caused by high torque conditions on the output shaft.

Many solutions to the above problems have been attempted in the past. Among the solutions considered have been attempts to increase the dwell time between pressure and exhaust for a device utilized as a motor. This method was advantageous because it maintained the valve symmetry necessary for reversible operation and allowed the use of standard well known manufacturing techniques. However, it was found that oil was trapped in the displacement mechanism, greatly accelerating the wear of the displacement mechanism and, in some instances, damaging the device or displacement mechanism from the high pressure created in the cells of the displacement mechanism. Another solution, which was attempted in the instance of a motor was to close the exhaust of a displacement mechanism cell early. It was found that this was a satisfactory solution for one direction of rotation of the device, but, when operating the device in the other direction, it was found that the proposed valve timing deviation resulted in pressurizing a displacement cell earlier and closing of the exhaust from the cell later, resulting in a very inefficient fluid operated motor.

With these comments in mind, it is to the elimination of these and other disadvantages to which the present invention is directed, along with the inclusion therein of other novel and desirable features.

An object of this invention is to provide a new and improved fluid operated device of a simple and inexpensive construction and operation.

Another object of this invention is to provide a novel fluid operated operated device which utilizes a valve synchronized with a displacement mechanism wherein that device may be operated in either direction of rotation with optimum efficiency.

Still another object of this invention is the provision of an improved fluid operated device wherein the valve timing arrangement compensates for manufacturing erors, displacement mechanism wear and wear at the drive connection between the valve and the displacement mechanism.

A further object of this invention is the provision of a new and novel fluid operated device having a valve which provides optimum operation and efficiency in either direction of rotation and which provides timing in either direction which is unaffected by shaft deflection during high torque loads on the output shaft of the device.

These and other objects and advantages of this invention will more fully appear from the following description made in connection with the accompanying drawings, wherein like reference characters refer to the same or similar parts throughout the several views.

BRIEF DESCRIPTION OF THE DRAWINGS

In the drawings,

FIG. 3 is a sectional view taken along the lines 3—3 of FIG. 1;

FIG. 4 is a diagrammatic view of a commutator valve and gerotor type displacement mechanism, typical of prior art devices and showing theoretical optimum timing; pressure areas are shown in cross hatching, exhaust areas are shown in diagonal hatching and neutral areas are shown in horizontal hatching;

FIG. 5 is a diagrammatic view of the valving arrangement of FIG. 4 showing a timing error typically experienced in the practical operation with the timing arrangement of the valve of FIG. 4;

DESCRIPTION OF THE PREFERRED EMBODIMENTS

Figure 1:
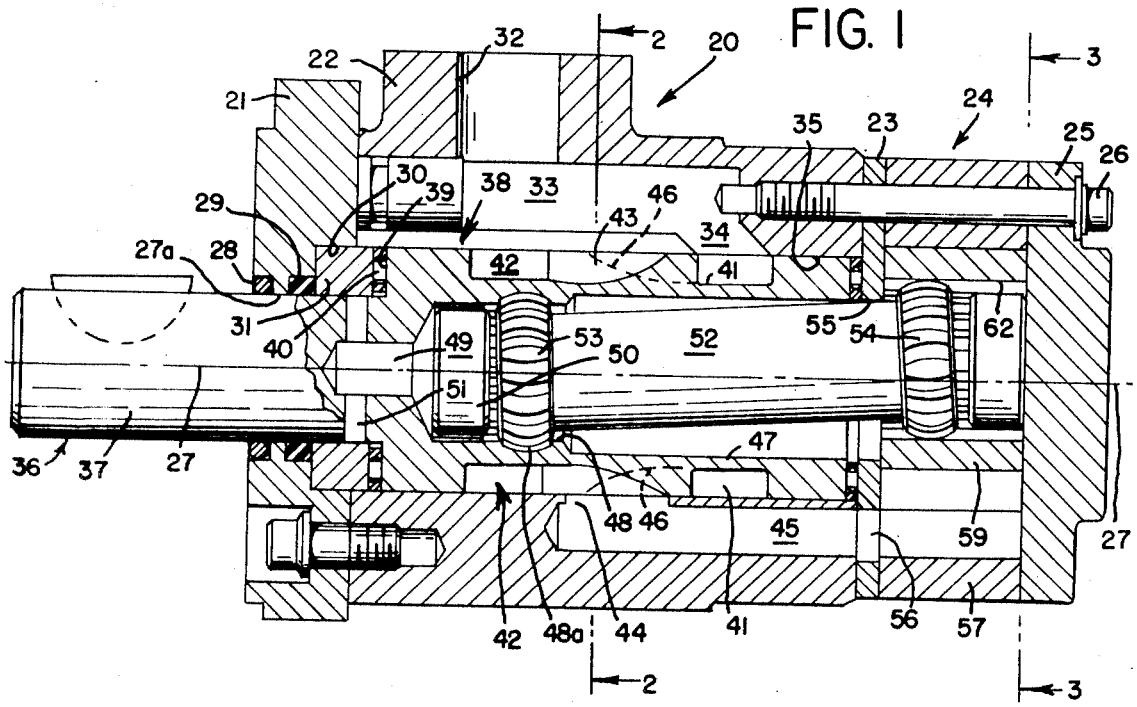
FIG. 1 is a longitudinal sectional view of a fluid operated device taken along the lines 1—1 of FIG. 2.

Referring now to FIG. 1, a fluid operated device is shown, indicated in general at 20. The device shown uses an axial spool type commutator valve and a gerotor type internal-external displacement mechanism. The valve rotates at the rotational speed of the star member of the gerotor set. The device is operable as a motor by providing fluid under pressure to the motor and receiving exhaust fluid from the motor, taking the power therefrom at the shaft. The device is operable as a pump by providing power at the shaft thereof, providing fluid at one port thereof and receiving fluid under pressure from the other port thereof. The device is generally cylindrically shaped and comprises a forward end cap 21, a valve housing section 22, a valve plate 23, a displacement mechanism 24 and an end cap 25. These elements are retained in the order indicated by the plurality of radially spaced, axially extending bolts 26, providing a motor or pump frame or body, having an axis 27. For purposes of illustration only, the device discussed hereinbelow will be considered operable as a motor unless otherwise indicated.

Forward end plate 21 includes a shaft receiving bore 27 having annular seals 28 and 29 therein. Counterbore 30 receives shaft supporting collar 31.

Valve housing section 22 includes fluid receiving port 32 and a fluid exhaust port which is not shown. Fluid receiving port 32 communicates with axially oriented passage 33 having valve confronting opening 34 communicating with valve receiving bore 35 which is concentric with axis 27. The fluid exhaust port correspondingly communicates with an axial passage having a valve confronting opening.

Shaft member 36 is mounted within valve housing section 22 and forward end plate 21 for rotatable movement therein substantially about axis 27 which coincides with the axis of shaft member 36. Shaft power takeoff or input section 37 projects outwardly from forward end plate 21 through bore 27.

Shaft member 36 includes a valve member 38 affixed thereto, and typically integral therewith. A shoulder 39 is provided between the shaft portion 37 and valve portion 38 and positioned in confronting relation with collar 31. Thrust bearing 40 is sandwiched between shoulder 39 and collar 31. Valve 38 includes a pair of axially spaced annular fluid receiving and exhausting grooves. The groove receiving fluid under pressure is indicated by numeral 41 and the groove receiving exhaust fluid is indicated at 42. Groove 41 communicates with opening 34 in valve housing section 22. The corresponding opening for annular groove 42 is not shown. Of course, the porting may be reversed, reversing the function of grooves 41 and 42.

Figure 2:
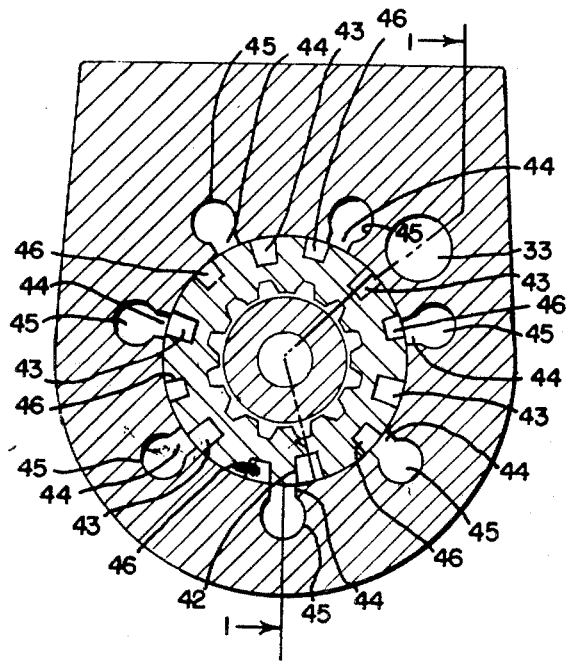
FIG. 2 is a sectional view taken along the lines 2—2 of FIG. 1.

Valve 38 includes a plurality of axially extending, radially spaced slots 43 extending from annular groove 42 and adapted to communicate with a plurality of openings 44 in valve housing section 22 in a predetermined pattern. Openings 44, in turn, communicate with a plurality of axially extending and radially spaced passages 45. Correspondingly, a plurality of axially extending and radially spaced slots 46 extend from annular ring 41 and alternately communicate with openings 44. As shown in FIG. 2, slots 43 and 46 are alternately positioned on valve 38. Passages 45 correspond in number to the number of cells, and slots 43 (as well as alternately positioned slots 46) correspond in number to the number of teeth of the star member of the gerotor set. It should be noted that the spacing of slots 43 and 46 about the circumference of valve member 38 is not symmetrical. The function and importance of the valve slots and spacing will be treated hereinbelow following the description of the structure of the fluid operated device.

Shaft member 36 includes bore 47 which is concentric with axis 27. Counterbore 48 is provided and is adapted to receive a drive positioning element. Counterbore 48, which includes a spline portion 48a is in fluid communication with counterbore 49 and 47. A drive positioning element 50 is affixed within counterbore 48 and includes an opening therein (not shown) which is in fluid communication with bores 48 and 49. Passages 51, which are connected to bore 49, are provided to receive oil which flows through the high pressure interfaces of the fluid operated device into bore 47 in order to provide lubrication to shaft surfaces in contact with stationary collar 31.

A drive member 52 extends between and mechanically connects the shaft 36 and valve 38 with displacement mechanism 24. Shaft member 52 includes heads 53 and 54 at each end thereof, which are frustospherically shaped and provided with splines. The splines at head 53 are equal in number to, and mesh with, splines 48a in bore 48 of shaft 36. Shaft member 52 projects from the bore 47 through bore 55 in valve plate 23 into displacement mechanism 24. Bore 55 is concentric with axis 27. Valve plate 23 also includes a plurality of openings 56 corresponding in number to passages 45 in housing 22 and in fluid communication therewith.

Displacement mechanism 24 described herein is of the gerotor type and includes a stationary outer ring 57, having teeth 58 thereon. The ring member is concentric with axis 27. Star member 59 is eccentrically disposed relative to ring member 57 and rotates on axis 60, as shown in FIG. 3. Star member 59 includes a plurality of teeth 61 numbering one less than the number of teeth 58 of ring member 57. A bore 62, having splines therein, is provided in star member 59 concentric with axis 60. Head portion 54 of drive member 52 is positioned therein. The number of splines at bore 62 is equal to the number of splines on head member 54 and mesh therewith in driving relation. It should be noted that drive 52 is always in a cocked or tilted position relative to axis 27, angulated by the eccentricity of axis 60 upon which star member 59 rotates and the axis 27 of ring member 57. As the star member rotates in a selected direction about axis 60, it will orbit in the opposite direction with axis 60 orbiting about axis 27. A star member having six teeth will have one revolution about its axis 60 for every six times that the star member orbits in the opposite direction about axis 27. Thus head portion 54 of drive member 52 has both rotational and orbital movement in common with the star member while head member 53 has rotational movement only, in common with valve 38 and shaft 36. As the star member rotates and orbits expanding and contracting cells 63 are formed. A line of eccentricity 64 is defined as that line which passes through axis 27 and axis 60 at a given instant. The cells on one side of the line of eccentricity are under pressure and, on the other side, under exhaust.

OPERATION

The general operation of a fluid operated motor is well known and will not be treated in detail herein. That portion of the operation of the motor pertaining to the connection and timing between the valve and displacement mechanism will, however, be treated in detail, and is best seen by referring to FIGS. 4–12.

Referring now to FIG. 4, a valve and displacement mechanism typical of prior art devices is shown diagrammatically. FIG. 4 represents theoretically perfect timing between the valve and displacement mechanism. The valve is indicated by numeral 65, and corresponds to valve 38 of FIG. 2. Valve 65 includes a plurality of equally and alternately spaced pressure slots 66 and exhaust slots 67 corresponding to slots 43 and 46 of FIG. 2. A displacement mechanism of the gerotor type is shown, and includes a stationary ring member 68 and a rotating and orbiting star member 69 corresponding to ring 57 and star 59 of FIG. 3. The axis of the ring member is denoted by 70 and the axis of the star member is denoted by 71. During rotation of the star in the direction of arrow 72, the star orbits in the direction of arrow 73. The valve rotates in the direction shown by arrow 74, synchronized with the rotation of the star. The ratio between the orbiting and rotating speeds is dependent upon the ratio between the ring and star member teeth. If that ratio is seven to six, as illustrated herein, the rotating speed of the star will be one-sixth of its orbiting speed. By reason of the drive connection between the star and the valve, the valve rotates at the same speed and in the same direction as the star. The valve is a commutating type valve and supplies pressure to and from the gerotor mechanism at the orbiting frequency of the star. During the operation of the star, rotational and orbital movements of the star within the ring form continuously expanding and contracting cells. Cells under pressure are indicated at 75 and shown crosshatched; cells under exhaust are indicated at 76 and shown diagonally hatched. A neutral cell is indicated at 77 and shown horizontally hatched. Passages 79 connect the rotating valve pressure exhaust slots 66 and 67 with the expanding and contracting cells 75 and 76 in predetermined sequence. Line of eccentricity 78 separates the pressure cells from the exhaust cells at the instant shown. The line of eccentricity is determined by a line passing through the axis of the ring and the axis of the star.

Referring to FIG. 5, the practical operation of the connection between the displacement mechanism and valve of the prior art type is shown. The connection between the displacement mechanism and the valve, as well as the displacement mechanism and the valve apart from the connecting means, are each subject to manufacturing errors, torsional loads and normal wear. Therefore, timing errors result. These errors result in retarding the rotation of the valve in the direction of arrow 74 relative to the rotation of the star in the direction of arrow 72. The effect of the retardation of the valve relative to the displacement mechanism is shown in FIG. 5 at passage 79′ between the displacement mechanism and the valve. It should be noted that the position of the displacement mechanism in FIG. 5 is identical to the position of the displacement mechanism in FIG. 4. However, the relative position between the displacement mechanism and valve is different between FIGS. 4 and 5 with the valve retarded in FIG. 5 due to the effect of wear, load or manufacturing errors. Fluid under pressure from valve pressure slot 66′ flows, in the normal fashion, through passage 79 to cell 75. However, since exhaust slot 67′ is in fluid communication with passage 79′ formerly in neutral as shown in FIG. 4, flow of oil proceeds from the pressure passage 66′ through passage 79 into cell 75 and leakage occurs to cell 77′ and into exhaust slot 67′ of valve 65. This leak or "short circuit" greatly decreases the efficiency of the displacement mechanism. During rotation of the valve and displacement mechanism, power is lost continuously in this manner as each pressurized cell is followed by a cell which is "short circuited" to an exhaust passage.

With further reference to FIGS. 4 and 5, it should be noted that the effects of wear, torsional loads and manufacturing errors which cause improper timing could be offset by slightly advancing valve 65 (FIG. 4) in the direction of arrow 74. Therefore, during operation of the valve and displacement mechanism, torsional loads, wear or manufacturing errors, would cause the advanced valve to assume the position shown in FIG. 4, providing proper timing. This is a totally impractical solution, however, since it is difficult to predict the frequency or type of manufacturing errors, the wear pattern between parts and the amount of torsional loads, each of which affect the timing in a different degree. Further, this solution would be adequate, if at all, for a unidirectional motor only. If this solution were attempted for a reversible motor, the advanced timing compensation in one direction would, in the other direction of rotation of the motor, result in retarding the timing (FIG. 5) with the resultant undesirable effects.

It should also be noted that during the break in period of a motor with advanced timing compensation, oil would be trapped in predetermined cells until such time as wear, torsion loads, or manufacturing errors result in the advanced timing assuming the theoretical position shown in FIG. 4. Until such time, oil may be trapped in predetermined cells, oftentimes damaging the displacement mechanism. For this additional reason, the above solution cannot reasonably be considered.

Figure 6:
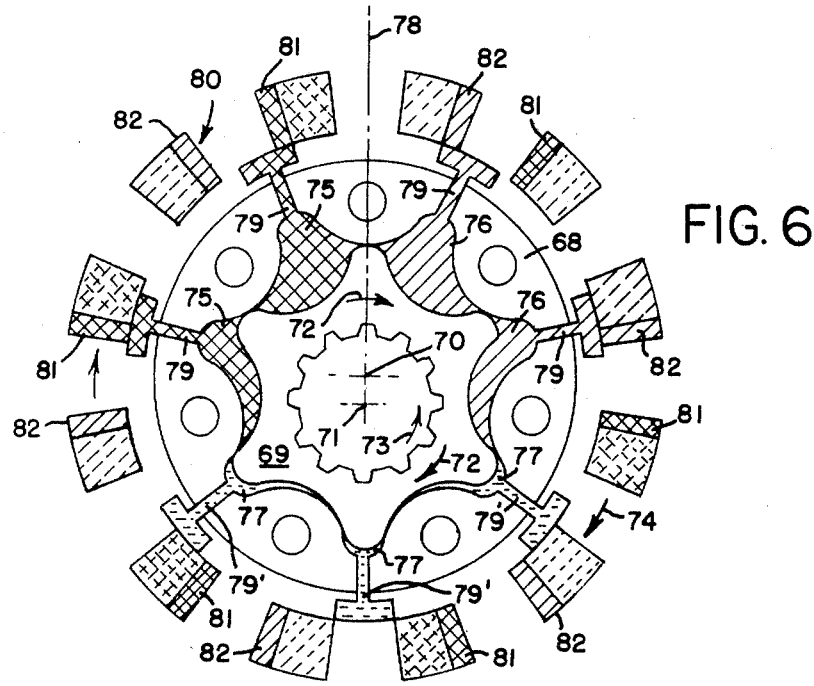
FIG. 6 is a diagrammatic view of the valving arrangement of this invention showing the maximum reversible timing deviation, with the prior art timing arrangement of FIG. 4 shown in dotted lines.

With the problems of prior art timing in mind, and considering the difficulties of proposed solutions, reference may now be made to FIG. 6. The valve and displacement mechanism of this invention is shown diagrammatically in the corresponding position of the prior art mechanism of FIG. 4. Valve 80 includes a plurality of pressure slots 81 (crosshatched) and exhaust slots 82 (diagonally hatched). Prior art slots are superimposed and shown with the pressure areas in dotted crosshatching and the exhaust areas in dotted diagonal hatching, for purposes of illustration only. It should be noted that line of eccentricity 78 separates the pressure side from the exhaust side. As in FIGS. 4 and 5, cells under pressure are numbered 75, those under exhaust 76, and neutral cells 77.

Passages connecting valve 80 with cells 75 and 76 respectively are indicated by numeral 79. Attention is drawn to neutral passages 79'. It should be noted that although the displacement mechanism and the valve are in a position corresponding to the position in FIG. 4, the positions of the pressure and exhaust slots 81 and 82 respectively relative to passages 79 and 79' are quite different. From a consideration of FIG. 6, it can be determined that, in the direction of arrow 74, the exhaust is closed earlier than the exhaust shown in FIG. 4 and pressurizing is done later than shown in FIG. 4. For reversible operation, the direction of valve 80 is opposite to that of the direction shown by arrow 74 and, further, exhaust slots become 81 and pressure slots 82. Therefore, the same advantages are obtained for the reversed direction. In either direction, short circuiting cannot occur, since wear, torsional loads or manufacturing errors will not result in retardation of the improved valve to the point at which "short circuiting" occurs; further, the trapping problem is avoided.

Figure 7:
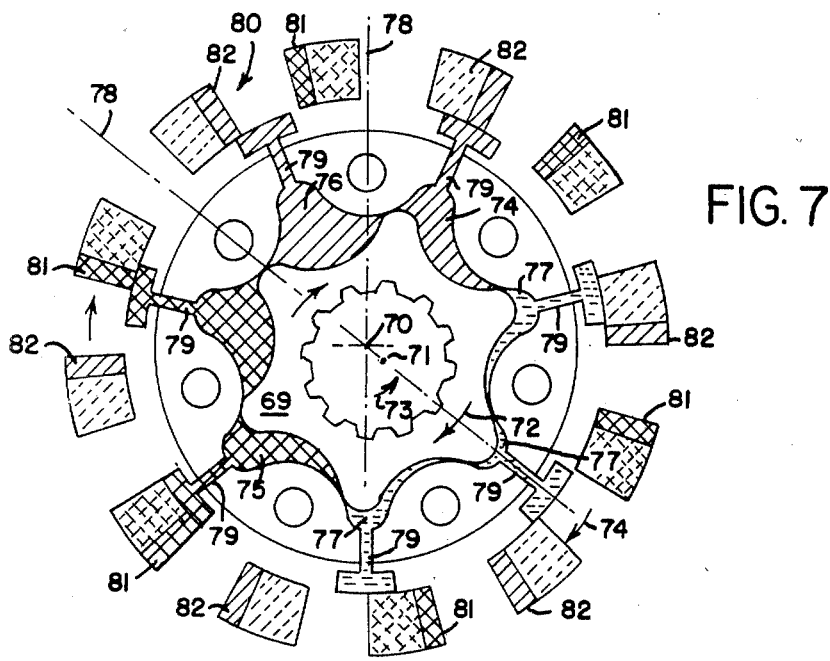
FIG. 7 is a diagrammatic view showing rotation of the valve and displacement mechanism star member, in the direction indicated by the arrows, eight and four-sevenths degrees from the ring member position shown in the diagrammatic view of FIG. 6.
Figure 8:
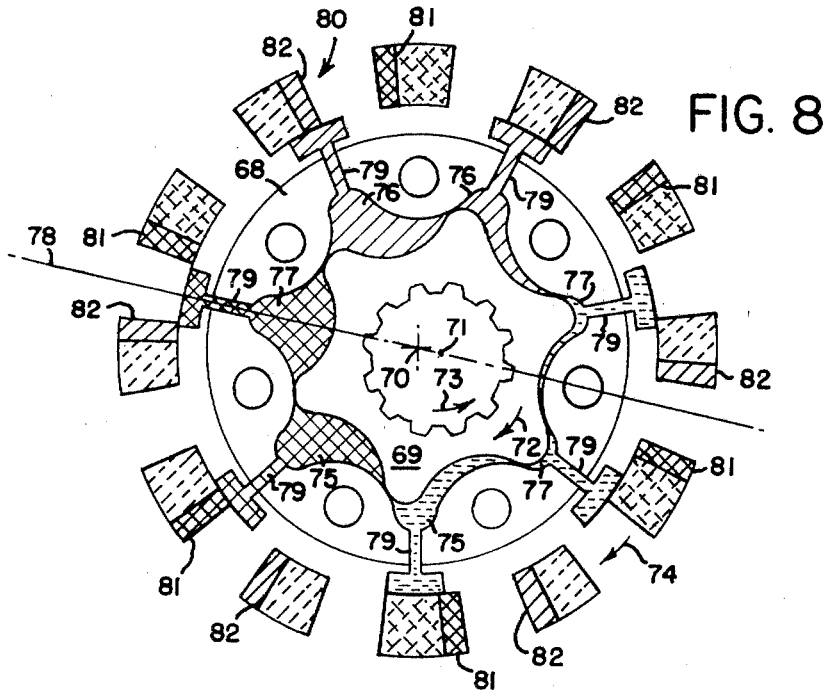
FIG. 8 is a diagrammatic view showing the valving arrangement of FIG. 6 rotated twelve and six-sevenths degrees from the ring member position shown in FIG. 6.

Referring now to FIG. 7, the displacement mechanism and valve 80 have been rotated in the direction of arrow 74 to a position eight and four-sevenths degrees from that position shown in FIG. 6. From a consideration of FIG. 7, it can be seen that a high degree of torsional loads, manufacturing errors or wear would not result in "short circuiting" as shown in FIG. 5. FIG. 8 shows another selected position of the displacement mechanism and valve, with rotation in the direction of arrow 74 four and two-sevenths degrees from the position shown in FIG. 7. Again, it can be noted that the short circuiting problem will not occur.

Figure 9:
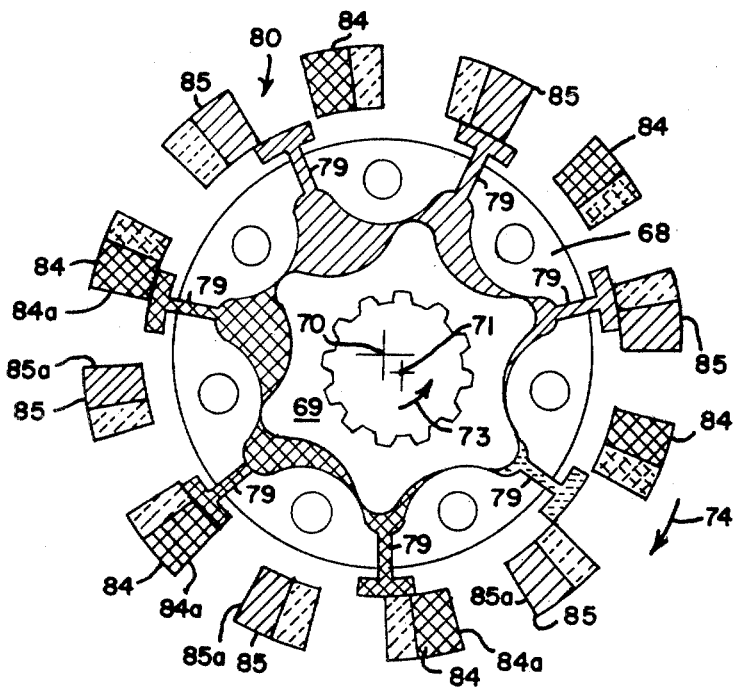
FIG. 9 is a diagrammatic view of an alternate timing deviation with the valve and displacement mechanism in a position corresponding to the position shown in FIG. 7 with the valving arrangement of FIG. 4 shown in dotted lines.

Referring now to FIG. 9, it can be seen that the widths of the pressure slots 84 and exhausts slots 85 may be increased, changing the point in time at which an exhaust slot is closed and a pressure slot is opened relative to the passages 79 to and from the cells. It should be noted that considering the direction of rotation of the valve in the direction of arrow 74, the position of the trailing edge of the pressure slot 84a and the leading edge 85a of the exhaust slot is not varied. The time for closing the exhaust slot relative to passage 79 may be varied, but not the point at which the exhaust is begun. Similarly, the trailing edge of the pressure slot is retained and only the leading edge or point in time at which the passage 79 is pressurized may be changed. In this manner timing may be changed providing optimum efficiency and preventing trapping in either direction of rotation.

Figure 10:
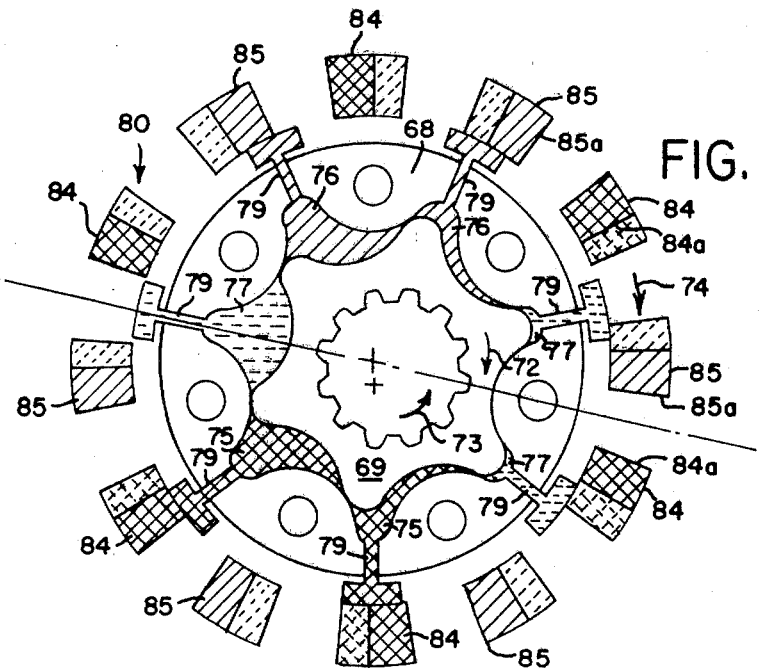
FIG. 10 is a diagrammatic view of the alternate embodiment of FIG. 9 showing the valve and displacement mechanism rotated in the direction of the arrows four and two-sevenths degrees from the position shown in FIG. 9.

FIG. 10 shows a position of the valve and displacement mechanism rotated four and two-sevenths degrees from the position shown in FIG. 9, further illustrating the prevention of "short circuiting" and elimination of trapping in either direction of rotation.

Figure 11:
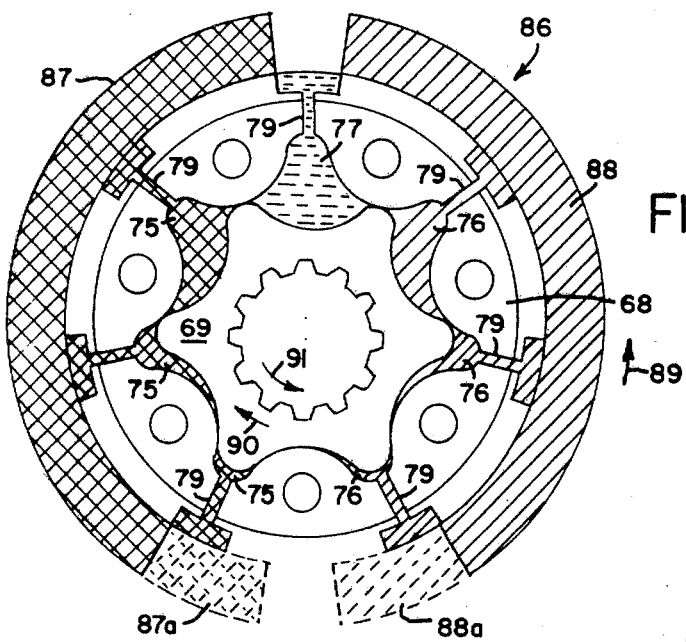
FIG. 11 is a diagrammatic view of another alternate embodiment of this invention, wherein the valve rotates at the orbiting speed of the internal member of the gerotor set, the position shown corresponding to the position shown for the valve and displacement mechanism of FIG. 6 and shown with dotted lines to indicate the prior art timing.

FIG. 11 shows another alternate embodiment of this invention, which utilizes a valve which rotates at the orbiting speed of the star of the displacement mechanism. The means for connecting the orbiting action of the displacement mechanism to the valve is well known and will not be discussed herein. Since the valve rotates at the orbiting speed of the displacement mechanism, it must rotate considerably faster than the valve hereinabove, which rotates at the rotating speed of the displacement mechanism. The timing problems of the high speed valve and the displacement mechanism of FIG. 11 are the same as described in the other embodiments of this invention, and are as undesirable. The high speed valve is shown in FIG. 11 in a position corresponding to the position of the low speed valve shown in FIG. 4. Of course, the short circuiting problems as well as the trapping problems can occur in a valve of this type in the same manner as they would occur in the valve of the slow speed type. Further, advancing of the valve for compensation prevents the efficient use of the valve and displacement mechanism for reversible rotation. As can be seen from FIG. 11, valve 86 includes a pressure port 87 (crosshatching) and an exhaust port 88 (diagonal hatching). The prior art high speed valve is shown in dotted crosshatching at 87a, and the exhaust in dotted diagonal hatching at 88a. It should be noted that the drive to the valve causes the valve to rotate in the opposite direction.

Figure 12:
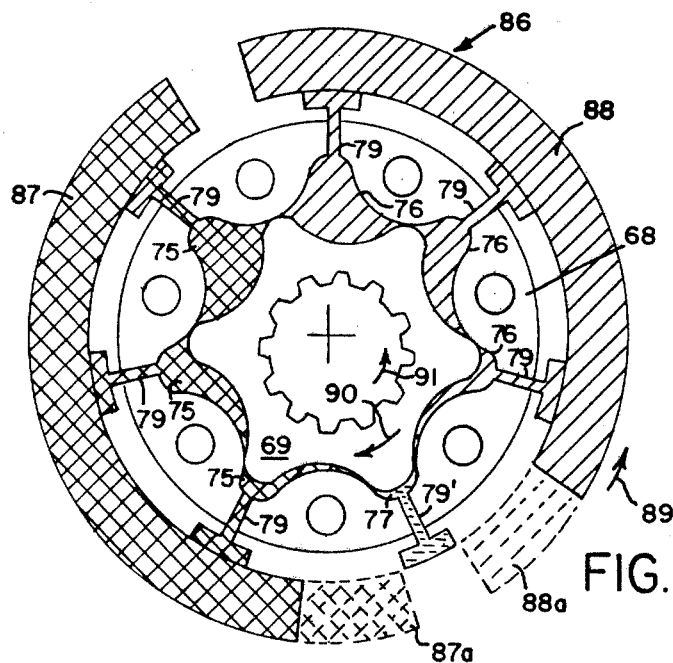
FIG. 12 is a diagrammatic view of the alternate embodiment of FIG. 11 showing the inner member of the displacement mechanism rotated four and two-sevenths degrees from the position shown in FIG. 11 and the valve rotated twenty-five and five-sevenths degrees.

As shown in FIG. 12, the valve has been rotated twenty-five and five-sevenths degrees in the direction of arrow 89, corresponding to a rotation in the other direction of the displacement mechanism star member 69 four and two-sevenths degrees in the direction of arrow 90. The star orbits in the direction of arrow 91. It should be noted at passage 79' a prior art valve leakage could occur in the event there is a retarding of rotation of the prior art valve (dotted hatching) in the direction indicated by arrow 89, thereby causing a "short circuit." It should also be noted that in the reverse direction pressure and exhaust is changed and port 87 becomes exhaust, while port 88 becomes pressure. Of course, the direction of rotation of the valve is counter to the direction indicated by arrow 89. This timing deviation provides optimum efficiency in either direction of rotation and provides for preventing of the trapping effect which could occur from an improper advance of the valve relative to the displacement mechanism. Further, this compensation will, in the same manner as the compensation described above, compensate for torsion loads, manufacturing errors and wear of the parts.

It will, of course, be understood that various changes may be made in the form, details, arrangement and proportions of the various parts without departing from the scope of this invention.

We claim:
1. In a fluid operated device, alternately operable as a pump and reversible motor, and having
    a housing with fluid inlet and outlet ports therein and a predetermined number of fluid pressure and exhaust passages arranged therein in predetermined position to alternately convey fluid under pressure and exhaust fluid,
    a displacement mechanism having a plurality of continuously expanding and contracting cells each in fluid communication with a fluid exhaust and pressure passage in the housing,
    a shaft mounted in said housing for rotational move- operably connecting to the displacement mechanism, mechanism,
    the improvement comprising
    a valve mechanism rotatably mounted in the housing, the valve being in fluid communication with the inlet and outlet ports in the housing and the fluid pressure and exhaust passages in the housing and means operably connecting said valve mechanism to the displacement mechanism for synchronous rotation therewith,
    said valve having a plurality of fluid directing openings adapted to alternately receive fluid under pressure and discharge exhaust fluid between the displacement mechanism cells and the inlet and outlet ports, the openings spaced in said valve in a predetermined position relative to the displacement mechanism providing, during rotation of the displacement mechanism in synchronization with said valve, fluid under pressure to predetermined cells of said displacement mechanism and conveyance of exhaust fluid from predetermined cells of said placement mechanism, the predetermined spacing of the openings in said valve providing the time between exhausting and pressurizing a cell to be greater than the time between pressurizing and exhausting the cell in either direction of operation when utilizing the device as a reversible motor and the time between pressurizing and ex- hausting of a cell to be greater than the time between exhausting and pressurizing a cell when the device is used as a pump, thereby minimizing leakage in the displacement mechanism and providing optimum efficiency during operation of the device.

2. The fluid operated device of claim 1 wherein the displacement mechanism comprises a gerotor set including an outer stationary ring member and inner rotating and orbiting star member and including a drive member connecting said star member with the shaft translating the rotational motion and cancelling the orbiting motion of the star member.

3. The fluid operated device of claim 2 wherein said valve is connected to the shaft and said valve rotates at the rotating speed of said star member.

4. The fluid operated device of claim 2 wherein said valve rotates at the orbiting speed of the star member.

References Cited

UNITED STATES PATENTS

| Re. 14,187 | 8/1916 | Dock | 103—103 |
| 3,261,235 | 7/1966 | Henkel | 91—56 X |
| 3,270,683 | 9/1966 | McDermott | 103—130 |
| 3,272,142 | 9/1966 | Easton | 103—130 |
| 3,283,723 | 11/1966 | Charlson | 103—130 |
| 3,289,542 | 12/1966 | Fikse | 91—56 |
| 3,405,603 | 10/1968 | Woodling | 91—56 |

MARTIN P. SCHWADRON, Primary Examiner

I. C. COHEN, Assistant Examiner

UNITED STATES PATENT OFFICE
CERTIFICATE OF CORRECTION

Patent No. 3,514,234                              Dated May 26, 1970

Inventor(s) Kenneth A. Albers et al.

It is certified that error appears in the above-identified patent and that said Letters Patent are hereby corrected as shown below:

Column 8, before line 49, insert -- ment therein and projecting therefrom, and means --; line 50, cancel "mechanism,".

Signed and sealed this 2nd day of May 1972.

(SEAL)
Attest:

EDWARD M. FLETCHER, JR.                         ROBERT GOTTSCHALK
Attesting Officer                                Commissioner of Patents